US012600870B2

(12) United States Patent
Moghimian et al.

(10) Patent No.: US 12,600,870 B2
(45) Date of Patent: Apr. 14, 2026

(54) NON-OXIDIZED GRAPHENE-BASED ANTI-VIRAL COATING

(71) Applicant: NanoXplore Inc., Montreal (CA)

(72) Inventors: Nima Moghimian, Saint Laurent (CA); Soroush Nazarpour, Saint Therese (CA)

(73) Assignee: NanoXplore Inc., Montreal (CA)

( * ) Notice: Subject to any disclaimer, the term of this patent is extended or adjusted under 35 U.S.C. 154(b) by 0 days.

(21) Appl. No.: 17/356,066

(22) Filed: Jun. 23, 2021

(65) Prior Publication Data

US 2021/0403724 A1     Dec. 30, 2021

Related U.S. Application Data

(60) Provisional application No. 63/043,410, filed on Jun. 24, 2020.

(51) Int. Cl.
| | |
|---|---|
| *C09D 7/62* | (2018.01) |
| *C09D 5/14* | (2006.01) |
| *C09D 7/80* | (2018.01) |

(52) U.S. Cl.
CPC ................. *C09D 7/62* (2018.01); *C09D 5/14* (2013.01); *C09D 7/80* (2018.01)

(58) Field of Classification Search
CPC ............... C09D 7/62; C09D 7/80; C09D 5/14
See application file for complete search history.

(56) References Cited

U.S. PATENT DOCUMENTS

| | | | | |
|---|---|---|---|---|
| 5,705,541 | A | * | 1/1998 | Awe .......................... C08K 3/36 |
| | | | | 523/220 |
| 9,469,542 | B2 | | 10/2016 | Bozalina et al. |

FOREIGN PATENT DOCUMENTS

| | | | | |
|---|---|---|---|---|
| CN | 106349867 A | * | 1/2017 | ............. C08C 19/28 |
| CN | 109423160 A | * | 3/2019 | ........... C09D 163/00 |

(Continued)

OTHER PUBLICATIONS

Nadiv et al. "Graphene nanoribbon—Polymer composites: The critical role of edge functionalization" Carbon 99 (2016) 444-450.*

(Continued)

*Primary Examiner* — Robert S Walters, Jr.
(74) *Attorney, Agent, or Firm* — COOLEY LLP

(57) ABSTRACT
Embodiments described herein relate to non-oxidized graphene-based anti-viral surfaces, and methods of producing the same. In some embodiments, a method of forming an anti-viral surface can include mixing a non-oxidized edge-functionalized graphene with a catalyst and a thermoset material to form a mixture, applying a high-shear mixing process to the mixture to form a mixed liquid, and coating the mixed liquid onto a base surface to form the anti-viral surface. In some embodiments, the method can further include chemically treating the graphene to produce the non-oxidized edge-functionalized graphene. In some embodiments, the thermoset material can include a thermoset matrix. In some embodiments, the method can include dispersing the non-oxidized edge-functionalized graphene into the thermoset matrix via the high-shear mixing. In some embodiments, dispersing the non-oxidized edge-functionalized graphene into the thermoset matrix can be via a ball mill, a high-shear mixer, and/or a homogenizer.

32 Claims, 2 Drawing Sheets

10

11
Chemically treat graphene

12
Mix graphene with catalyst and thermoset material to form mixture

13
Apply high shear mixing process to form mixed liquid

14
Coat the mixed liquid onto base surface to form anti-viral surface

15
Cure the anti-viral surface

(56)                    References Cited

FOREIGN PATENT DOCUMENTS

| WO | WO-9301234 | A1 | * | 1/1993 | .......... C08G 59/304 |
| WO | WO-2013173053 | A1 | | 11/2013 | |
| WO | WO-2019217402 | A1 | * | 11/2019 | ......... C08G 18/0823 |

OTHER PUBLICATIONS

Liu et al. "Edge-functionalized graphene as reinforcements of epoxy-based conductive composite for electrical interconnects" Composites Science and Technology 88 (2013) 84-91.*

Kim et al. "Edge-functionalized graphene-like platelets as a co-curing agent and a nanoscale additive to epoxy resin" J. Mater. Chem., 2011, 21, 7337-7342 (Year: 2011).*

Zabihi et al. "A sustainable approach to scalable production of graphene based flame retardant using waste fish deoxyribonucleic acid" Journal of Cleaner Production 247 (2020) 119150 available online Nov. 2019.*

Bose et al. "Covalent Functionalization of Graphene Using Polyacryloyl Chloride and Performance of Functionalized Graphene-Epoxy Nanocomposite" Polymer Composites vol. 39, Issue 9, 2018 (Year: 2018).*

Li et al. "Edge-selectively amidated graphene for boosting H2-evolution activity of TiO2 photocatalyst" Applied Catalysis B: Environmental 264 (2020) 118504 May 2020 (Year: 2020).*

Chen et al., "Emerging coronaviruses: Genome structure, replication, and pathogenesis", Journal of Medical Virology: vol. 92, Issue 4, Jan. 2020, 7 pages.

Kim, Kyung-Su, "Edge-functionalized graphene-like platelets as co-curing and nanoscale additives to epoxy resin," A thesis submitted to the Interdisciplinary School of Green Energy and the Graduate School of UNIST in partial fulfillment of the requirements for the degree of Master of Science, Nov. 29, 2010, 53 pages.

* cited by examiner

FIG. 1

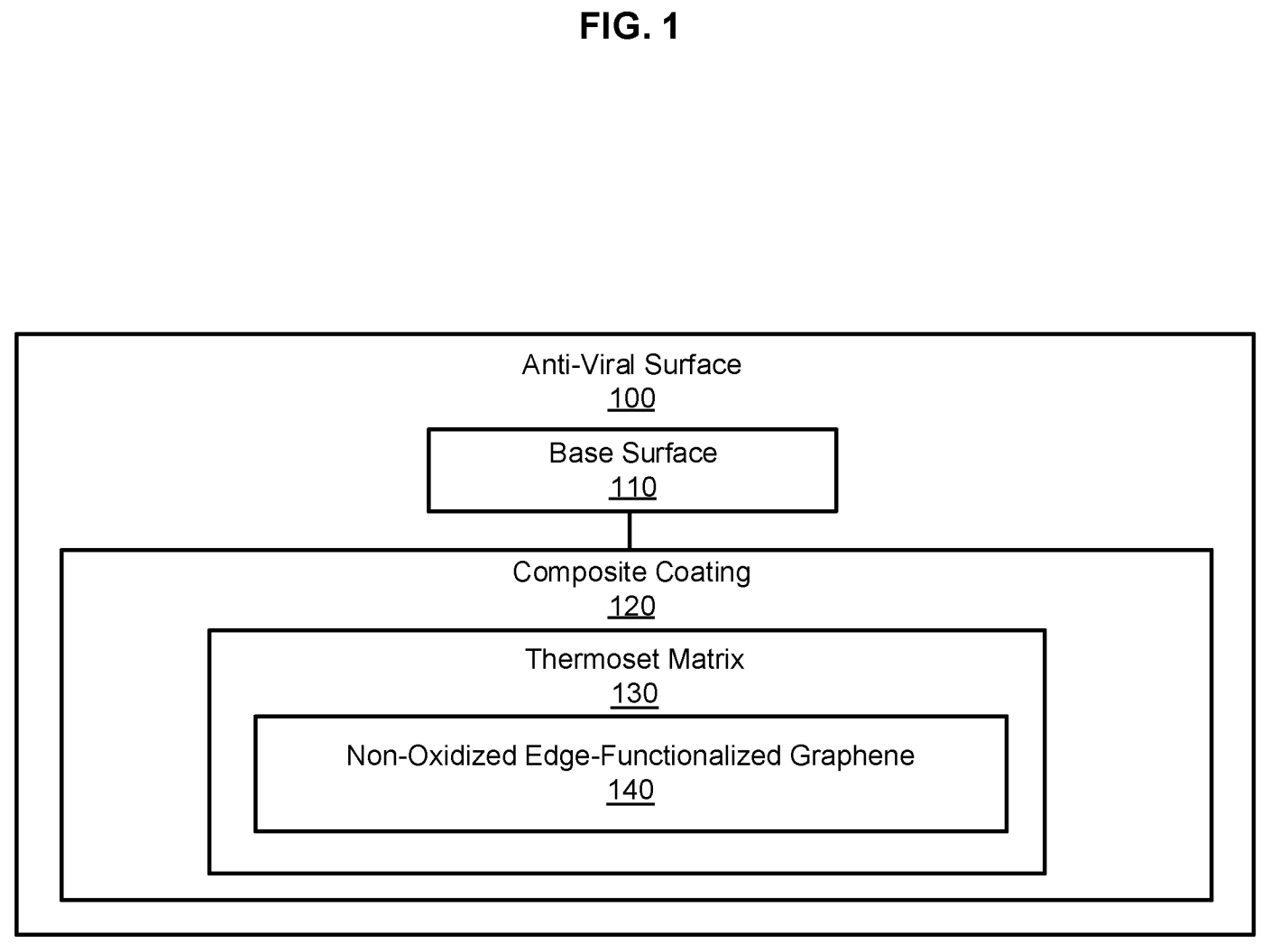

Anti-Viral Surface
100

Base Surface
110

Composite Coating
120

Thermoset Matrix
130

Non-Oxidized Edge-Functionalized Graphene
140

11 Chemically treat graphene

12 Mix graphene with catalyst and thermoset material to form mixture

13 Apply high shear mixing process to form mixed liquid

14 Coat the mixed liquid onto base surface to form anti-viral surface

15 Cure the anti-viral surface

10

NON-OXIDIZED GRAPHENE-BASED ANTI-VIRAL COATING

CROSS-REFERENCE TO RELATED APPLICATIONS

This application claims the priority to and the benefit of U.S. Provisional Application No. 63/043,410, entitled "A NON-OXIDIZED GRAPHENE-BASED ANTI-VIRAL COATING," and filed on Jun. 24, 2020, the disclosure of which is hereby incorporated by reference in its entirety.

TECHNICAL FIELD

Embodiments described herein relate to non-oxidized graphene-based anti-viral coatings and methods of producing the same.

BACKGROUND

During early 2020, World Health Organization (WHO) announced a new pandemic of coronavirus disease 2019 (Covid-19) caused by Severe Acute Respiratory Syndrome CoronaVirus 2 (SARS-CoV-2). This appearance is produced by the peplomers of the surface (or spike; designated S) glycoprotein radiating from the virus lipidenvelope (Y. Chen, J Med Virol, 2020). SARS-CoV-2 is a highly contagious virus capable of spreading primarily from person to person, either directly or through a contaminated surface. Although viruses do not grow on any nonliving surfaces, recent studies show coronaviruses can remain infectious on metal, glass, wood, fabrics and plastic surfaces for several hours to days. Anti-viral surfaces can help limit or prevent the spread of SARS-CoV-2 and other viruses.

SUMMARY

Embodiments described herein relate to non-oxidized graphene-based anti-viral surfaces, and methods of producing the same. In some embodiments, a method of forming an anti-viral surface can include mixing a non-oxidized edge-functionalized graphene with a catalyst and a thermoset material to form a mixture, applying a high-shear mixing process to the mixture to form a mixed liquid, and coating the mixed liquid onto a base surface to form the anti-viral surface. In some embodiments, the method can further include chemically treating the graphene to produce the non-oxidized edge-functionalized graphene. In some embodiments, the thermoset material can include a thermoset matrix. In some embodiments, the method can include dispersing the non-oxidized edge-functionalized graphene into the thermoset matrix via the high-shear mixing. In some embodiments, dispersing the non-oxidized edge-functionalized graphene into the thermoset matrix can be via a ball mill, a high-shear mixer, and/or a homogenizer. In some embodiments, the method can further include dispersing the non-oxidized edge-functionalized graphene into a solvent prior to dispersing the non-oxidized edge-functionalized graphene into the thermoset matrix. In some embodiments, the solvent can include styrene.

BRIEF DESCRIPTION OF THE DRAWINGS

FIG. 1 is a block diagram of an anti-viral surface, according to an embodiment.

Figure 2:
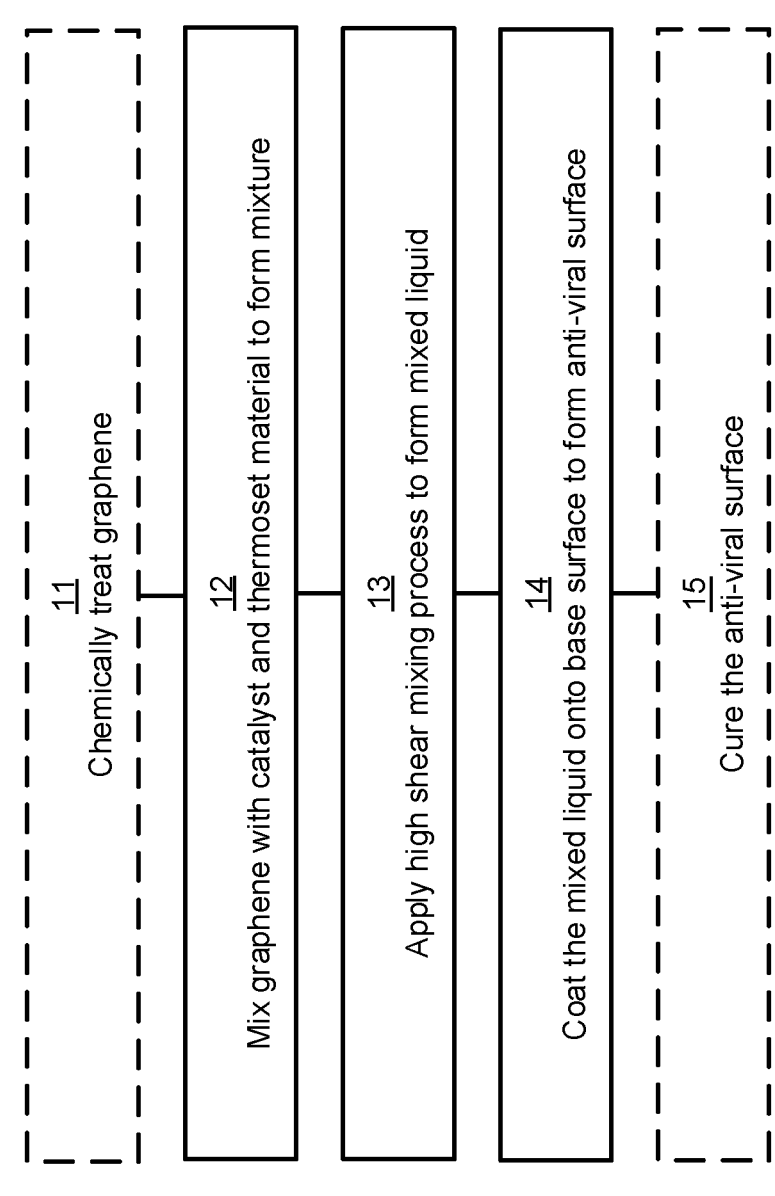
FIG. 2 is a block diagram of a method of producing an anti-viral surface, according to an embodiment.

The various elements depicted in the drawings are merely representational and are not necessarily drawn to scale. Certain sections thereof may be exaggerated, while others may be minimized. The drawings are intended to illustrate example embodiments of the disclosure that can be understood and appropriately carried out by those of ordinary skill in the art.

DETAILED DESCRIPTION

Embodiments described herein relate to a non-oxidized graphene-based anti-viral coating and a preparation method thereof. The present disclosure relates to self-cleaning properties of the coating through a combination of positive charges and low energy of the surface of the coating. In some embodiments, coatings described herein can have anti-viral efficacy against SARS-CoV-2.

Graphene is a single, one atomic thick layer of the common mineral graphite and is the first example of a truly two-dimensional material. Graphene is transparent, extremely flexible yet still rigid, and is a very effective thermal and electrical conductor. Graphene can be used to develop products that are light, robust, transparent, flexible, and stretchable. Such products can include electronic paper, bendable personal communication devices, and more energy-efficient airplanes. Graphene-based batteries can enable electric cars to drive for longer periods of time and smart phones that can charge faster, compared to the current state of the art. Graphene can filter salt, heavy metals, and oil from water and enable more efficient solar energy conversion. Graphene coatings can prevent steel and aluminum from rusting and, in the longer term, can give rise to new computational paradigms and improved medical applications. Such medical applications can include artificial retinas and brain electrodes.

Scalable graphene synthesis methods often include reduction of graphene oxide compounds obtained from oxidation of graphite and chemical vapor deposition (CVD). Graphene produced from reducing the graphene oxide represents poor crystalline quality and high density of in-plane defects. Furthermore, such products are often unsafe and environmentally hazardous, as they use strong acids that are explosive with a risk of toxic gas release. CVD techniques often use vacuum drying during the processing, which increases production costs and hinders scalability for industrial use. A top-down process where graphene is directly exfoliated without an oxidation process is an effective process in terms of cost and scalability. While non-oxidized graphene often has high crystallinity and electrical properties, it often has poor dispersibility, limiting its applications. Several methods of graphene production are described in U.S. Pat. No. 9,469,542, filed Oct. 18, 2016, and titled "Large scale production of thinned graphite, graphene, and graphite-graphene composites," the entirety of which is hereby incorporated by reference. In some embodiments, graphene can be edge-functionalized during an exfoliation process, resulting in an improved dispersibility with little crystalline imperfection and superior electrical conductivity.

Graphene sheets, either pure or dispersed into thermoplastics or thermosets, can exhibit excellent anti-microbial and anti-bacterial properties, particularly when exposed to ultraviolet rays. Embodiments described herein relate to a family of graphene-based coatings or paint with anti-microbial, anti-bacterial, anti-dirt, and/or anti-viral properties. Some embodiments described herein relate to anti-viral properties of non-oxidized graphene. In some embodiments, non-oxidized graphene can be used against SARS-CoV-2. In some embodiments, a mixture of edge-functionalized graphene with thermoset materials such as polyester or epoxy can be included in a coating with enhanced surface properties. Such enhancement of surface properties can translate into higher charge density of the surface and lower surface energy values. High charge density disrupts the spike proteins of SARS-CoV-2 and low surface energy limits the ability of the virus to stay on the surface of the coating.

Embodiments described herein relate to a family of processes for producing graphene-based coatings or paint with anti-microbial, anti-bacterial, anti-dirt, and/or anti-viral properties. In some embodiments, the coatings or paint produced from processes described herein can have antiviral properties that are useful against SARS-CoV-2. In some embodiments, processes described herein can include using a high-shear mixing technique, wherein graphene flakes remain preferentially intact in order to maximize electrical conductivity and hydrophobicity.

Without wishing to be bound by any particular theory, graphene can inhibit the entry and replication of an enveloped DNA virus (e.g., herpesvirus) or an RNA virus (e.g., coronavirus) in their target cells. Embodiments described herein can also be effective against feline coronavirus (FCoV) and infectious bursal disease virus (IBDV). Embodiments described herein can be effective against enveloped and non-enveloped viruses.

In some embodiments, a concentration of non-oxidized and/or edge-functionalized graphene can be added into a polymeric matrix to form a mixture. In some embodiments, the non-oxidized and/or edge-functionalized graphene can account for less than about 10 wt % of the mixture. In some embodiments, the polymeric matrix can include an unsaturated polyester. In some embodiments, the non-oxidized and/or edge-functionalized graphene can be mixed with the polymeric matrix using typical mixing equipment such as homogenizer or high shear mixer. In some embodiments, additives can be incorporated into the mixture to adjust the viscosity of the mixture. In some embodiments, the mixture can be a resin. In some embodiments, compatibilizers can be incorporated into the mixture. After effective dispersion, the mixture can be mixed with a curing agent and sprayed over a substrate made of glass and cured by exposure to ambient environment.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts.

For example, when referring to a set of coatings, the set of coatings can be considered as one coating with multiple portions, or the set of coatings can be considered as multiple, distinct coatings. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

The "efficiency" and/or effectiveness of producing thinned graphite while avoiding or minimizing reduction in lateral sheet size can be characterized by a parameter such as an aspect ratio of the product of the graphitic material production process (e.g., thinned graphite, single layer graphene, few-layer graphene (FLG), etc.). The aspect ratio can be defined as a ratio of an in-plane lateral dimension (also referred to herein as "lateral size") to the thickness of the product of the graphitic material production process. For example, if a thinned crystalline graphite product has an average lateral dimension of 300 $\mu m$ and a thickness of 200 nm, the sheet size to thickness ratio, or "aspect ratio", can be defined as 300,000/200 (i.e., 1,500). As another example, if a FLG product has an average lateral dimension of 1 $\mu m$ and a thickness of 1 nm (e.g., approximately three layers of graphene), the aspect ratio can be defined as 1,000/1 (i.e., 1,000).

FIG. 1 is a block diagram of an anti-viral surface 100, according to an embodiment. As shown, the anti-viral surface 100 includes a base surface 110 and a composite coating 120. The composite coating 120 includes a thermoset matrix 130 with graphene 140 dispersed therein. In some embodiments, the composite coating 120 includes a compatibilizer 150. The composite coating 120 is disposed on the base surface 110.

The base surface 110 can include any surface that is intended to be coated with anti-viral coating. In some embodiments, the base surface 10 can include a surface in a sterilized environment, such as a hospital, a laboratory, a dry room, or a clean room. In some embodiments, the base surface 110 can include a surface in a public facility, such as a restroom, a convention center, or a commercial building. In some embodiments, the base surface can include a surface in a private residence. In some embodiments, the base surface 110 can include an organic surface. In some embodiments, the base surface 110 can include an inorganic surface. In some embodiments, the base surface 110 can include a living surface (e.g., human skin, a tree). In some embodiments, the base surface 110 can be composed of glass, metal, steel, aluminum, a polyester, organic materials, wood, concrete, asphalt, drywall, granite, marble, soft fabric, wool, or any combination thereof.

The composite coating 120 is disposed on the base surface 110. In some embodiments, the composite coating 120 can be coupled to the base surface 110 via intermolecular forces. In some embodiments, the composite coating 120 can be coupled to the base surface 110 via van der Waals forces, hydrogen bonding, dipole-dipole interactions, or any combination thereof. In some embodiments, the composite coating 120 can be chemically bonded to the base surface 110. In some embodiments, the compose coating 120 can be covalently bonded to the base surface 110. In some embodiments, the composite coating 120 can be bonded to the base surface 110 via ionic interactions. In some embodiments, the composite coating 120 can include paint. In some embodiments, the composite coating 120 can include rheological modifiers to adjust the viscosity of the composite coating

120. In some embodiments, the rheological modifiers can include inorganic rheological modifiers such as bentonite, silicas, calcium carbonate, calcinated clays, zirconates, aluminates, or any combination thereof. In some embodiments, the rheological modifiers can include organic rheological modifiers, such as cellulosics, polysaccharides, castor oil derivatives, calcium sulfonate derivatives, synthetic fibers, polyester, aramid, or any combination thereof. In some embodiments, the rheological modifiers can include both inorganic and organic rheological modifiers.

In some embodiments, the composite coating 120 can have a thickness of at least about 10 nm, at least about 20 nm, at least about 30 nm, at least about 40 nm, at least about 50 nm, at least about 60 nm, at least about 70 nm, at least about 80 nm, at least about 90 nm, at least about at least about 100 nm, at least about 200 nm, at least about 300 nm, at least about 400 nm, at least about 500 nm, at least about 600 nm, at least about 700 nm, at least about 800 nm, at least about 900 nm, at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 200 μm, at least about 300 μm, at least about 400 μm, at least about 500 μm, at least about 600 μm, at least about 700 μm, at least about 800 μm, or at least about 900 μm. In some embodiments, the composite coating 120 can have a thickness of no more than about 1 mm, no more than about 900 μm, no more than about 800 μm, no more than about 700 μm, no more than about 600 μm, no more than about 500 μm, no more than about 400 μm, no more than about 300 μm, no more than about 200 μm, no more than about 100 μm, no more than about 90 μm, no more than about 80 μm, no more than about 70 μm, no more than about 60 μm, no more than about 50 μm, no more than about 40 μm, no more than about 30 μm, no more than about 20 μm, no more than about 10 μm, no more than about 9 μm, no more than about 8 μm, no more than about 7 μm, no more than about 6 μm, no more than about 5 μm, no more than about 4 μm, no more than about 3 μm, no more than about 2 μm, no more than about 1 μm, no more than about 900 nm, no more than about 800 nm, no more than about 700 nm, no more than about 600 nm, no more than about 500 nm, no more than about 400 nm, no more than about 300 nm, no more than about 200 nm, no more than about 100 nm, no more than about 90 nm, no more than about 80 nm, no more than about 70 nm, no more than about 60 nm, no more than about 50 nm, no more than about 40 nm, no more than about 30 nm, or no more than about 20 nm.

Combinations of the above-referenced thicknesses of the composite coating 120 are also possible (e.g., at least about 10 nm and no more than about 1 mm or at least about 500 nm and no more than about 200 μm), inclusive of all values and ranges therebetween. In some embodiments, the composite coating 120 can have a thickness of about 10 nm, about 20 nm, about 30 nm, about 40 nm, about 50 nm, about 60 nm, about 70 nm, about 80 nm, about 90 nm, about 100 nm, about 200 nm, about 300 nm, about 400 nm, about 500 nm, about 600 nm, about 700 nm, about 800 nm, about 900 nm, about 1 μm, about 2 μm, about 3 μm, about 4 μm, about 5 μm, about 6 μm, about 7 μm, about 8 μm, about 9 μm, about 10 μm, about 20 μm, about 30 μm, about 40 μm, about 50 μm, about 60 μm, about 70 μm, about 80 μm, about 90 μm, about 100 μm, about 200 μm, about 300 μm, about 400

μm, about 500 μm, about 600 μm, about 700 μm, about 800 μm, about 900 μm, or about 1 mm.

In some embodiments, the composite coating 120 can have a viscosity of at least about 0.05 Pa·s, at least about 0.06 Pa·s, at least about 0.07 Pa·s, at least about 0.08 Pa·s, at least about 0.09 Pa·s, at least about 0.1 Pa·s, at least about 0.2 Pa·s, at least about 0.3 Pa·s, at least about 0.4 Pa·s, at least about 0.5 Pa·s, at least about 0.6 Pa·s, at least about 0.7 Pa·s, at least about 0.8 Pa·s, at least about 0.9 Pa·s, at least about 1 Pa·s, at least about 2 Pa·s, at least about 3 Pa·s, or at least about 4 Pa·s when measured at 50 rpm at room temperature. In some embodiments, the composite coating 120 can have a viscosity of no more than about 5 Pa·s, no more than about 4 Pa·s, no more than about 3 Pa·s, no more than about 2 Pa·s, no more than about 1 Pa·s, no more than about 0.9 Pa·s, no more than about 0.8 Pa·s, no more than about 0.7 Pa·s, no more than about 0.6 Pa·s, no more than about 0.5 Pa·s, no more than about 0.4 Pa·s, no more than about 0.3 Pa·s, no more than about 0.2 Pa·s, no more than about 0.1 Pa·s, no more than about 0.09 Pa·s, no more than about 0.08 Pa·s, no more than about 0.07 Pa·s, no more than about 0.06 Pa·s when measured at 50 rpm at room temperature. Combinations of the above-referenced viscosities are also possible (e.g., at least about 0.05 Pa·s and no more than about 5 Pa·s or at least about 0.1 Pa·s and no more than about 1 Pa·s), inclusive of all values and ranges therebetween. In some embodiments, the composite coating 120 can have a viscosity of about 0.05 Pa·s, about 0.06 Pa·s, about 0.07 Pa·s, about 0.08 Pa·s, about 0.09 Pa·s, about 0.1 Pa·s, about 0.2 Pa·s, about 0.3 Pa·s, about 0.4 Pa·s, about 0.5 Pa·s, about 0.6 Pa·s, about 0.7 Pa·s, about 0.8 Pa·s, about 0.9 Pa·s, about 1 Pa·s, about 2 Pa·s, about 3 Pa·s, about 4 Pa·s, or about 5 Pa·s when measured at 50 rpm at room temperature.

In some embodiments, the composite coating 120 can have a thixotropic coefficient of at least about 1, at least about 2, at least about 3, at least about 4, at least about 5, at least about 6, at least about 7, at least about 8, at least about 9, at least about 10, at least about 11, at least about 12, at least about 13, at least about 14, at least about 15, at least about 16, at least about 17, at least about 18, or at least about 19. In some embodiments, the composite coating 120 can have a thixotropic coefficient of no more than about 25, no more than about 24, no more than about 23, no more than about 22, no more than about 21, no more than about 20, no more than about 19, no more than about 18, no more than about 17, no more than about 16, no more than about 15, no more than about 14, no more than about 13, no more than about 12, no more than about 11, no more than about 10, no more than about 9, no more than about 8, no more than about 7, or no more than about 6. Combinations of the above-referenced thixotropic coefficients of the composite coating 120 are also possible (e.g., at least about 1 and no more than about 25 or at least about 5 and no more than about 20), inclusive of all values and ranges therebetween. In some embodiments, the composite coating 120 can have a thixotropic coefficient of about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, or about 25.

The thermoset matrix 130 can be part of a thermoset material. In some embodiments, the thermoset material can include an unsaturated polyester. In some embodiments, the thermoset material can include an unsaturated epoxy. In some embodiments, the thermoset material can include polyester resin, novolak, melamine resin, furan resin, polybenzoaxine, silicone, urea-formaldehyde, polyimide, polyhexahydrotazine, a polyol, polyurethane, polysocyanurate, Bakelite, vinyl ester resin, or any combination thereof. In some embodiments, the thermoset material can include a curing agent. In some embodiments, the curing agent can include a metal oxide. In some embodiments, the curing agent can include an ultraviolet (UV)-curing additive. In some embodiments, the curing agent can include an aliphatic amine, aminoethylpiperazine, diethylenetriamine, triethylenetetramine, an aromatic amine, melamine formaldehyde, a cycloaliphatic amine, isophorone diamine, a polyamide, an amidoamine, an anhydride, or methylhexahydrophthalic anhydride.

In some embodiments, the graphene 140 can be dispersed in the thermoset matrix 130. In some embodiments, the graphene 140 can be non-oxidized or substantially non-oxidized. In some embodiments, less than about 1% of the carbon atoms in the graphene 140 can be oxidized. In some embodiments, less than about 0.5%, less than about 0.1%, less than about 0.05%, less than about 0.01%, less than about 500 ppm, less than about 100 ppm, less than about 50 ppm, less than about 50 ppm, less than about 10 ppm, less than about 5 ppm, less than about 1 ppm, less than about 500 ppb, less than about 100 ppb, less than about 50 ppb, less than about 10 ppb, less than about 5 ppb, or less than about 1 ppb of the carbon atoms in the graphene 140 can be oxidized, inclusive of all values and ranges therebetween.

In some embodiments, the graphene 140 can be edge-functionalized. In some embodiments, the edge-functionalized graphene can be in the form of partially reduced graphene oxide (GO), carboxylated graphene, carbonylated graphene, epoxide-functionalized graphene, hydroxylated graphene, amine functionalized graphene, or any combination thereof. In some embodiments, the graphene 140 can be edge-functionalized with ethylenediamine (EDA). In some embodiments, the graphene 14 can be edge-functionalized with polyethyleneimine (PEI).

In some embodiments, at least about 40%, at least about 45%, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99% of the edge carbon atoms in the graphene 140 can be functionalized. In some embodiments, no more than about 100%, no more than about 99%, no more than about 98%, no more than about 97%, no more than about 96%, no more than about 95%, no more than about 90%, no more than about 85%, no more than about 80%, no more than about 75%, no more than about 70%, no more than about 65%, no more than about 60%, no more than about 55%, no more than about 50%, or no more than about 45% of the edge carbon atoms in the graphene 140 can be functionalized. Combinations of the above-referenced percentages of edge carbon atoms in the graphene 140 that are functionalized are also possible (e.g., at least about 40% and no more than about 100% or at least about 50% and no more than about 80%), inclusive of all values and ranges therebetween. In some embodiments, about 40%, about 45%, about 50%, about 55%, about 60%, about 65%, about 70%, about 75%, about 80%, about 85%, about 90%, about 95%, about 96%, about 97%, about 98%, about 99%, or about 100% of the edge carbon atoms in the graphene 140 can be functionalized.

In some embodiments, at least a portion of the functional groups attached to the edges of the graphene 140 can be oxygen-containing functional groups. In some embodiments, at least about 0.01%, at least about 0.02%, at least about 0.03%, at least about 0.04%, at least about 0.05%, at least about 0.06%, at least about 0.07%, at least about 0.08%, at least about 0.09%, at least about 0.1%, at least about 0.2%, at least about 0.3%, at least about 0.4%, at least about 0.5%, at least about 0.6%, at least about 0.7%, at least about 0.8%, at least about 0.9%, at least about 1%, at least about 2%, at least about 3%, at least about 4%, at least about 5%, at least about 6%, at least about 7%, at least about 8%, or at least about 9% by weight of the graphene 140 can include oxygen-containing functional groups. In some embodiments, no more than about 10%, no more than about 9%, no more than about 8%, no more than about 7%, no more than about 6%, no more than about 5%, no more than about 4%, no more than about 3%, no more than about 2%, no more than about 1%, no more than about 0.9%, no more than about 0.8%, no more than about 0.7%, no more than about 0.6%, no more than about 0.5%, no more than about 0.4%, no more than about 0.3%, no more than about 0.2%, no more than about 0.1%, no more than about 0.09%, no more than about 0.08%, no more than about 0.07%, no more than about 0.06%, no more than about 0.05%, no more than about 0.04%, no more than about 0.03%, or no more than about 0.02% by weight of the graphene 140 can include oxygen-containing functional groups.

Combinations of the above-referenced weight percentages of the graphene 140 that include oxygen-containing functional groups are also possible (e.g. at least about 0.01% and no more than about 10% or at least about 0.1% and no more than about 1%), inclusive of all values and ranges therebetween. In some embodiments, about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, or about 10% by weight of the graphene 140 can include oxygen-containing functional groups.

In some embodiments, at least about 0.01%, at least about 0.02%, at least about 0.03%, at least about 0.04%, at least about 0.05%, at least about 0.06%, at least about 0.07%, at least about 0.08%, at least about 0.09%, at least about 0.1%, at least about 0.2%, at least about 0.3%, at least about 0.4%, at least about 0.5%, at least about 0.6%, at least about 0.7%, at least about 0.8%, at least about 0.9%, at least about 1%, at least about 2%, at least about 3%, at least about 4%, at least about 5%, at least about 6%, at least about 7%, at least about 8%, or at least about 9% of the edge carbon atoms in the graphene 140 can be functionalized with oxygen-containing functional groups. In some embodiments, no more than about 10%, no more than about 9%, no more than about 8%, no more than about 7%, no more than about 6%, no more than about 5%, no more than about 4%, no more than about 3%, no more than about 2%, no more than about 1%, no more than about 0.9%, no more than about 0.8%, no more than about 0.7%, no more than about 0.6%, no more than about 0.5%, no more than about 0.4%, no more than about 0.3%, no more than about 0.2%, no more than about 0.1%, no more than about 0.09%, no more than about 0.08%, no more than about 0.07%, no more than about 0.06%, no more than about 0.05%, no more than about 0.04%, no more than about 0.03%, or no more than about 0.02% of the edge carbon atoms in the graphene 140 can be functionalized with oxygen-containing functional groups.

Combinations of the above-referenced percentages of the edge carbon atoms in the graphene 140 that are functionalized oxygen-containing functional groups are also possible (e.g. at least about 0.01% and no more than about 10% or at least about 0.1% and no more than about 1%), inclusive of all values and ranges therebetween. In some embodiments, about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, or about 10% of the edge carbon atoms in the graphene 140 can be functionalized with oxygen-containing functional groups.

In some embodiments, the graphene 140 can account for at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, at least about 30%, at least about 35%, at least about 40%, or at least about 45% of the total mass of the composite coating 120. In some embodiments, the graphene 140 can account for no more than about 50%, no more than about 45%, no more than about 40%, no more than about 35%, no more than about 30%, no more than about 25%, no more than about 20%, no more than about 15%, no more than about 10%, no more than about 9%, no more than about 8%, no more than about 7%, no more than about 6%, no more than about 5%, no more than about 4%, no more than about 3%, or no more than about 2% of the total mass of the composite coating 120. Combinations of the above-referenced mass percentages of the graphene 140 in the composite coating 120 are also possible (e.g., at least about 1% and no more than about 50% or at least about 5% and no more than about 30%), inclusive of all values and ranges therebetween. In some embodiments, the graphene 140 can account for about 1%, about 2%, about 3%, about 4%, about 5%, about 6%, about 7%, about 8%, about 9%, about 10%, about 15%, about 20%, about 25%, about 30%, about 35%, about 40%, about 45%, or about 50% of the total mass of the composite coating 120.

In some embodiments, the graphene 140 can include graphene sheets that have a thickness of at least about 1 graphene layer, at least about 2 graphene layers, at least about 3 graphene layers, at least about 4 graphene layers, at least about 5 graphene layers, at least about 6 graphene layers, at least about 7 graphene layers, at least about 8 graphene layers, at least about 9 graphene layers, at least about 10 graphene layers, at least about 20 graphene layers, at least about 30 graphene layers, at least about 40 graphene layers, at least about 50 graphene layers, at least about 60 graphene layers, at least about 70 graphene layers, at least about 80 graphene layers, at least about 90 graphene layers, at least about 100 graphene layers, at least about 200 graphene layers, at least about 300 graphene layers, or at least about 400 graphene layers. In some embodiments, the graphene 140 can include graphene sheets that have a thickness of no more than about 500 graphene layers, no more than about 400 graphene layers, no more than about 300 graphene layers, no more than about 200 graphene layers, no more than about 100 graphene layers, no more than about 90 graphene layers, no more than about 80 graphene layers, no more than about 70 graphene layers, no more than about 60 graphene layers, no more than about 50 graphene layers, no more than about 40 graphene layers, no more than about 30 graphene layers, no more than about 20 graphene layers, no more than about 10 graphene layers, no more than about 9 graphene layers, no more than about 8 graphene layers, no more than about 7 graphene layers, no more than about 6 graphene layers, no more than about 5 graphene layers, no more than about 4 graphene layers, no more than about 3 graphene layers, or no more than about 2 graphene layers.

Combinations of the above-referenced thicknesses of the graphene sheets of the graphene 140 are also possible (e.g., at least about 1 graphene layer and no more than about 500 graphene layers), inclusive of all values and ranges therebetween. In some embodiments, the graphene 140 can include graphene sheets that have a thickness of about 1 graphene layer, about 2 graphene layers, about 3 graphene layers, about 4 graphene layers, about 5 graphene layers, about 6 graphene layers, about 7 graphene layers, about 8 graphene layers, about 9 graphene layers, about 10 graphene layers, about 20 graphene layers, about 30 graphene layers, about 40 graphene layers, about 50 graphene layers, about 60 graphene layers, about 70 graphene layers, about 80 graphene layers, about 90 graphene layers, about 100 graphene layers, about 200 graphene layers, about 300 graphene layers, about 400 graphene layers, or about 500 graphene layers.

In some embodiments, the graphene 140 can include graphene sheets that have a thickness of at least about 0.3 nm, at least about 0.4 nm, at least about 0.5 nm, at least about 0.6 nm, at least about 0.7 nm, at least about 0.8 nm, at least about 0.9 nm, at least about 1 nm, at least about 2 nm, at least about 3 nm, at least about 4 nm, at least about 5 nm, at least about 6 nm, at least about 7 nm, at least about 8 nm, at least about 9 nm, at least about 10 nm, at least about 20 nm, at least about 30 nm, at least about 40 nm, at least about 50 nm, at least about 60 nm, at least about 70 nm, at least about 80 nm, at least about 90 nm, at least about 100 nm, at least about 200 nm, at least about 300 nm, or at least about 400 nm. In some embodiments, the graphene 140 can include graphene sheets that have a thickness of no more than about 500 nm, no more than about 400 nm, no more than about 300 nm, no more than about 200 nm, no more than about 100 nm, no more than about 90 nm, no more than about 80 nm, no more than about 70 nm, no more than about 60 nm, no more than about 50 nm, no more than about 40 nm, no more than about 30 nm, no more than about 20 nm, no more than about 10 nm, no more than about 9 nm, no more than about 8 nm, no more than about 7 nm, no more than about 6 nm, no more than about 5 nm, no more than about 4 nm, no more than about 3 nm, no more than about 2 nm, no more than about 1 nm, no more than about 0.9 nm, no more than about 0.8 nm, no more than about 0.7 nm, no more than about 0.6 nm, no more than about 0.5 nm, or no more than about 0.4 nm. Combinations of the above-referenced thicknesses of the graphene sheets in the graphene 140 are also possible (e.g., at least about 0.3 nm and no more than about 500 nm or at least about 5 nm and no more than about 50 nm), inclusive of all values and ranges therebetween. In some embodiments, the graphene 140 can include graphene sheets that have a thickness of about 0.3 nm, about 0.4 nm, about 0.5 nm, about 0.6 nm, about 0.7 nm, about 0.8 nm, about 0.9 nm, about 1 nm, about 2 nm, about 3 nm, about 4 nm, about 5 nm, about 6 nm, about 7 nm, about 8 nm, about 9 nm, about 10 nm, about 20 nm, about 30 nm, about 40 nm, about 50 nm, about 60 nm, about 70 nm, about 80 nm, about 90 nm, about 100 nm, about 200 nm, about 300 nm, about 400 nm, or about 500 nm.

In some embodiments, the graphene 140 can include graphene sheets that have a lateral size of at least about 10 nm, at least about 20 nm, at least about 30 nm, at least about 40 nm, at least about 50 nm, at least about 60 nm, at least about 70 nm, at least about 80 nm, at least about 90 nm, at least about 100 nm, at least about 200 nm, at least about 300 nm, at least about 400 nm, at least about 500 nm, at least about 600 nm, at least about 700 nm, at least about 800 nm, at least about 900 nm, at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 200 μm, at least about 300 μm, or at least about 400 μm. In some embodiments, the graphene 140 can include graphene sheets that have a lateral size of no more than about 500 μm, no more than about 400 μm, no more than about 300 μm, no more than about 200 μm, no more than about 100 μm, no more than about 90 μm, no more than about 80 μm, no more than about 70 μm, no more than about 60 μm, no more than about 50 μm, no more than about 40 μm, no more than about 30 μm, no more than about 20 μm, no more than about 10 μm, no more than about 9 μm, no more than about 8 μm, no more than about 7 μm, no more than about 6 μm, no more than about 5 μm, no more than about 4 μm, no more than about 3 μm, no more than about 2 μm, no more than about 1 μm, no more than about 900 nm, no more than about 800 nm, no more than about 700 nm, no more than about 600 nm, no more than about 500 nm, no more than about 400 nm, no more than about 300 nm, no more than about 200 nm, no more than about 100 nm, no more than about 90 nm, no more than about 80 nm, no more than about 70 nm, no more than about 60 nm, no more than about 50 nm, no more than about 40 nm, no more than about 30 nm, or no more than about 20 nm.

Combinations of the above-referenced lateral sizes of the graphene sheets in the graphene 140 are also possible (e.g., at least about 10 nm and no more than about 500 μm or at least about 50 μm and no more than about 100 μm), inclusive of all values and ranges therebetween. In some embodiments, the graphene 140 can include graphene sheets that have a lateral size of about 10 nm, about 20 nm, about 30 nm, about 40 nm, about 50 nm, about 60 nm, about 70 nm, about 80 nm, about 90 nm, about 100 nm, about 200 nm, about 300 nm, about 400 nm, about 500 nm, about 600 nm, about 700 nm, about 800 nm, about 900 nm, about 1 μm, about 2 μm, about 3 μm, about 4 μm, about 5 μm, about 6 μm, about 7 μm, about 8 μm, about 9 μm, about 10 μm, about 20 μm, about 30 μm, about 40 μm, about 50 μm, about 60 μm, about 70 μm, about 80 μm, about 90 μm, about 100 μm, about 200 μm, about 300 μm, about 400 μm, or about 500 μm.

In some embodiments, the graphene 140 can include graphene sheets with an aspect ratio of at least about 50, at least about 60, at least about 70, at least about 80, at least about 90, at least about 100, at least about 200, at least about 300, at least about 400, at least about 500, at least about 600, at least about 700, at least about 800, at least about 900, at least about 1,000, at least about 2,000, at least about 3,000, at least about 4,000, at least about 5,000, at least about 6,000, at least about 7,000, at least about 8,000, at least about 9,000, at least about 10,000, at least about 15,000, at least about 20,000, or at least about 25,000. In some embodiments, the graphene 140 can include graphene sheets with an aspect ratio of no more than about 30,000, no more than about 25,000, no more than about 20,000, no more than about 15,000, no more than about 10,000, no more than about 9,000, no more than about 8,000, no more than about 7,000, no more than about 6,000, no more than about 5,000, no more than about 4,000, no more than about 3,000, no more than about 2,000, no more than about 1,000, no more than about 900, no more than about 800, no more than about 700, no more than about 600, no more than about 500, no more than about 400, no more than about 300, no more than about 200, no more than about 100, no more than about 90, no more than about 80, no more than about 70, or no more than about 60.

Combinations of the above-referenced aspect ratios of graphene sheets in the graphene 140 are also possible (e.g., at least about 50 and no more than about 30,000 or at least about 1,000 and no more than about 10,000), inclusive of all values and ranges therebetween. In some embodiments, the graphene 140 can include graphene sheets with an aspect ratio of about 50, about 60, about 70, about 80, about 90, about 100, about 200, about 300, about 400, about 500, about 600, about 700, about 800, about 900, about 1,000, about 2,000, about 3,000, about 4,000, about 5,000, about 6,000, about 7,000, about 8,000, about 9,000, about 10,000, about 15,000, about 20,000, about 25,000, or about 30,000.

In some embodiments, the compatibilizer 150 can be incorporated into the composite coating 120. In some embodiments, the compatibilizer 150 can improve the stability of the composite coating 120, when the composite coating 120 includes materials with contrasting miscibility properties. In some embodiments, the compatibilizer 150 can include a siloxane-containing copolymer, a graft terpolymer, an amphiphilic block copolymer, maleic anhydride, or any combination thereof.

In some embodiments, the composite coating 120 can include at least about 0.1%, at least about 0.3%, at least about 0.4%, at least about 0.5%, at least about 0.6%, at least about 0.7%, at least about 0.8%, at least about 0.9%, at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, or at least about 19% by weight of the compatibilizer 150. In some embodiments, the composite coating 120 can include no more than about 20%, no more than about 19%, no more than about 18%, no more than about 17%, no more than about 16%, no more than about 15%, no more than about 14%, no more than about 13%, no more than about 12%, no more than about 11%, no more than about 10%, no more than about 9%, no more than about 8%, no more than about 7%, no more than about 6%, no more than about 5%, no more than about 4%, no more than about 3%, no more than about 2%, no more than about 1%, no more than about 0.9%, no more than about 0.8%, no more than about 0.7%, no more than about 0.6%, no more than about 0.5%, no more than about 0.4%, no more than about 0.3%, or no more than about 0.2% by weight of the compatibilizer 150. Combinations of the above-referenced of the above referenced weight percentages of the composite coating 120 made up by the compatibilizer 150 are also possible (e.g., at least about 0.1% and no more than about 20%, or at least about 1% and no more than about 10%), inclusive of all values and ranges therebetween. In some embodiments, the composite coating 120 can include about 0.1%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% by weight of the compatibilizer 150.

In some embodiments, the composite coating 120 can reduce the PFU of the base surface 110 by at least about 80%, at least about 85%, at least about 90%, at least about 91%, at least about 92%, at least about 93%, at least about 94%, at least about 95%, at least about 96%, at least about 97%, at least about 98%, at least about 99%, at least about 99.1%, at least about 99.2%, at least about 99.3%, at least about 99.4%, at least about 99.5%, at least about 99.6%, at least about 99.7%, at least about 99.8%, at least about 99.9%, at least about 99.91%, at least about 99.92%, at least about 99.93%, at least about 99.94%, at least about 99.95%, at least about 99.96%, at least about 99.97%, at least about 99.98%, or at least about 99.99%.

FIG. 2 shows a block diagram of a method 10 of producing an anti-viral surface, according to an embodiment. As shown, the method 10 optionally includes chemically treating graphene at step 11. The method 10 further includes mixing the graphene with a catalyst and a thermoset material to form a mixture at step 12, applying a high-shear mixing process to the mixture to form a mixed liquid at step 13, and coating the mixed liquid onto a base surface to form an anti-viral surface at step 14. The method 10 optionally includes curing the anti-viral surface at step 15.

In some embodiments, chemically treating the graphene at step 11 can include functionalizing the graphene. In some embodiments, step 11 can include doping nitrogen onto a graphene lattice to form a functionalized graphene. In some embodiments, step 11 can include treating the graphene lattice with one or more acids to create a functionalized graphene. In some embodiments, step 11 can include functionalizing the graphene with a carboxyl group, an amine group, a carbonyl group, an epoxide group, or any combination thereof.

Step 12 includes mixing the graphene with a catalyst and a thermoset material to form a mixture. In some embodiments, the graphene can have any of the properties of the graphene 140, as described above with reference to FIG. 1. In some embodiments, the graphene can be dispersed in a solvent during the mixing. In some embodiments, the solvent can include styrene. In some embodiments, the solvent can include styrene, xylene, methylmethacrylate, methylamylcetone, acetone, butyl acetate, or any combination thereof. In some embodiments, the thermoset material can include a thermoset matrix. In some embodiments, the thermoset material can include any of the thermoset materials that include the thermoset matrix 130, as described above with reference to FIG. 1. In some embodiments, the catalyst can include N,N-dimethyl-p-toluidine, dibutyltin dilaurate, a peroxide, dicumyl peroxide, di-tert-butyl peroxide, methyl ethyl ketone peroxide, a tin-based catalyst, in inorganic tin (II) based catalyst, an organotin (IV) based catalyst, or any combination thereof.

Step 13 includes a high-shear mixing process. In some embodiments, the high-shear mixing can disperse the graphene in the thermoset material. In some embodiments, the high-shear mixing process can include ball-milling, homogenizing, or any other high-shear mixing process or combinations thereof. In some embodiments, step 13 can be conducted in a high-shear mixer, a ball mill, and/or a homogenizer.

In some embodiments, the high-shear mixing at step 13 can be for a duration of at least about 1 second, at least about 5 seconds, at least about 10 seconds, at least about 30 seconds, at least about 1 minute, at least about 5 minutes, at least about 10 minutes, at least about 15 minutes, at least about 20 minutes, at least about 30 minutes, at least about 40 minutes, at least about 50 minutes, at least about 1 hour, at least about 2 hours, at least about 3 hours, at least about 4 hours, at least about 5 hours, at least about 10 hours, at least about 15 hours, or at least about 20 hours. In some embodiments, the high-shear mixing at step 13 can be for a duration of no more than about 1 day, no more than about 20 hours, no more than about 15 hours, no more than about 10 hours, no more than about 5 hours, no more than about 4 hours, no more than about 3 hours, no more than about 2 hours, no more than about 1 hour, no more than about 50 minutes, no more than about 40 minutes, no more than about 30 minutes, no more than about 20 minutes, no more than about 15 minutes, no more than about 10 minutes, no more than about 5 minutes, no more than about 1 minute, no more than about 30 seconds, no more than about 10 seconds, or no more than about 5 seconds. Combinations of the above-referenced durations of the mixing step 13 are also possible (e.g., at least about 1 second and no more than about 1 day or at least about 1 minute and no more than about 5 minutes), inclusive of all values and ranges therebetween. In some embodiments, the high-shear mixing at step 13 can be for a duration of about 1 second, about 5 seconds, about 10 seconds, about 30 seconds, about 1 minute, about 5 minutes, about 10 minutes, about 15 minutes, about 20 minutes, about 30 minutes, about 40 minutes, about 50 minutes, about 1 hour, about 2 hours, at about 3 hours, about 4 hours, about 5 hours, about 10 hours, about 15 hours, about 20 hours, or about 1 day.

In some embodiments, the high-shear mixing applied at step 13 can provide a mixing energy to the mixture of at least about 1 J/g, at least about 2 J/g, at least about 3 J/g, at least about 4 J/g, at least about 5 J/g, at least about 6 J/g, at least about 7 J/g, at least about 8 J/g, at least about 9 J/g, at least about 10 J/g, at least about 20 J/g, at least about 30 J/g, at least about 40 J/g, at least about 50 J/g, at least about 60 J/g, at least about 70 J/g, at least about 80 J/g, at least about 90 J/g, at least about 100 J/g, at least about 200 J/g, at least about 300 J/g, at least about 400 J/g, at least about 500 J/g, at least about 600 J/g, at least about 700 J/g, at least about 800 J/g, at least about 900 J/g. In some embodiments, the high-shear mixing applied at step 13 can provide a mixing energy to the mixture of no more than about 1,000 J/g, no more than about 900 J/g, no more than about 800 J/g, no more than about 700 J/g, no more than about 600 J/g, no more than about 500 J/g, no more than about 400 J/g, no more than about 300 J/g, no more than about 200 J/g, no more than about 100 J/g, no more than about 90 J/g, no more than about 80 J/g, no more than about 70 J/g, no more than about 60 J/g, no more than about 50 J/g, no more than about 40 J/g, no more than about 30 J/g, no more than about 20 J/g, no more than about 10 J/g, no more than about 9 J/g, no more than about 8 J/g, no more than about 7 J/g, no more than about 6 J/g, no more than about 5 J/g, no more than about 4 J/g, no more than about 3 J/g, or no more than about 2 J/g.

Combinations of the above-referenced mixing energies applied at step 13 are also possible (e.g., at least about 1 J/g and no more than about 1,000 J/g or at least about 30 J/g and no more than about 200 J/g), inclusive of all values and ranges therebetween. In some embodiments, the high-shear mixing applied at step 13 can provide a mixing energy to the mixture of about 1 J/g, about 2 J/g, about 3 J/g, about 4 J/g, about 5 J/g, about 6 J/g, about 7 J/g, about 8 J/g, about 9 J/g, about 10 J/g, about 20 J/g, about 30 J/g, about 40 J/g, about 50 J/g, about 60 J/g, about 70 J/g, about 80 J/g, about 90 J/g, about 100 J/g, about 200 J/g, about 300 J/g, about 400 J/g, about 500 J/g, about 600 J/g, about 700 J/g, about 800 J/g, about 900 J/g, or about 1,000 J/g.

In some embodiments, the high-shear mixing applied at step 13 can provide a mixing power to the mixture of at least about 0.1 W/g, at least about 0.2 W/g, at least about 0.3 W/g, at least about 0.4 W/g, at least about 0.5 W/g, at least about 0.6 W/g, at least about 0.7 W/g, at least about 0.8 W/g, at least about 0.9 W/g, at least about 1 W/g, at least about 2 W/g, at least about 3 W/g, at least about 4 W/g, at least about 5 W/g, at least about 6 W/g, at least about 7 W/g, at least about 8 W/g, at least about 9 W/g, at least about 10 W/g, at least about 20 W/g, at least about 30 W/g, at least about 40 W/g, at least about 50 W/g, at least about 60 W/g, at least about 70 W/g, at least about 80 W/g, or at least about 90 W/g. In some embodiments, the high-shear mixing applied at step 13 can provide a mixing power to the mixture of no more than about 100 W/g, no more than about 90 W/g, no more than about 80 W/g, no more than about 70 W/g, no more than about 60 W/g, no more than about 50 W/g, no more than about 40 W/g, no more than about 30 W/g, no more than about 20 W/g, no more than about 10 W/g, no more than about 9 W/g, no more than about 8 W/g, no more than about 7 W/g, no more than about 6 W/g, no more than about 5 W/g, no more than about 4 W/g, no more than about 3 W/g, no more than about 2 W/g, no more than about 1 W/g, no more than about 0.9 W/g, no more than about 0.8 W/g, no more than about 0.7 W/g, no more than about 0.6 W/g, no more than about 0.5 W/g, no more than about 0.4 W/g, no more than about 0.3 W/g, or no more than about 0.2 W/g. Combinations of the above-referenced mixing power values are also possible (e.g., at least about 0.1 W/g and no more than about 100 W/g or at least about 1 W/g and no more than about 10 W/g), inclusive of all values and ranges therebetween. In some embodiments, the high-shear mixing applied at step 13 can provide a mixing power to the mixture of about 0.1 W/g, about 0.2 W/g, about 0.3 W/g, about 0.4 W/g, about 0.5 W/g, about 0.6 W/g, about 0.7 W/g, about 0.8 W/g, about 0.9 W/g, about 1 W/g, about 2 W/g, about 3 W/g, about 4 W/g, about 5 W/g, about 6 W/g, about 7 W/g, about 8 W/g, about 9 W/g, about 10 W/g, about 20 W/g, about 30 W/g, about 40 W/g, about 50 W/g, about 60 W/g, about 70 W/g, about 80 W/g, about 90 W/g, or about 100 W/g.

Step 14 includes coating the mixed liquid formed in step 13 onto a base surface to form an anti-viral surface. In some embodiments, the coating process, can be via brushing, spraying, rolling, painting, flow coating, spin coating, or any other suitable coating method, or combinations thereof. In some embodiments, the coating can be in multiple phases. In other words, a first layer of the mixed liquid can be coated onto the base surface, the first layer can be cured, and then a second layer of the mixed liquid can be coated onto the first layer and then cured. In some embodiments, the coating can include coating 3, 4, 5, 6, 7, 8, 9, 10, or more than about 10 layers of the mixed liquid onto the base surface.

Step 15 includes curing the anti-viral surface. In some embodiments, the curing can be via UV-curing. In some embodiments, the curing can include the use of a curing agent. In some embodiments, the curing agent can include an aliphatic amine, aminoethylpiperazine, diethylenetri-amine, triethylenetetramine, an aromatic amine, melamine formaldehyde, a cycloaliphatic amine, isophorone diamine, a polyamide, an amidoamine, an anhydride, methylhexahy-drophthalic anhydride, or any combination thereof.

EXAMPLES

Samples of mixtures disposed on glass substrates were exposed to different concentrations of Human Respiratory Coronavirus 229E and compared versus non-coated glass substrate. Test was done according to Modified Quantitative Disk Carrier Test Method (ASTM 2197) to Determine the virucidal activity of an anti-viral coating. Test details are as follows:

Test System

1. Test Microorganism

Coronavirus 229E (ATCC VR-740): Coronavirus 229E is an enveloped virus in the genus Coronavirus. Members of this genus can cause acute respiratory infections such as SARS-1, SARS-2 (19-nCOV) and the Middle-East Respiratory Syndrome (MERS). Unlike these more pathogenic viruses, coronavirus 229E requires Biosafety Level 2 labs. Therefore, coronavirus 229E is frequently used as a surrogate for more pathogenic viruses to assess the activity of different technologies for infection prevention and control (IPAC).

2. Host Cell Line

MRC-5 cells were used as hosts to support the replication and quantitation of 229E. The cells were seeded into 12-well cell culture plates containing modified Eagle's medium (MEM) supplemented with 10% fetal bovine serum (FBS) and maintained at 36±1° C. in a humidified atmosphere of 5% CO2. Efficacy test was performed when the cell monolayer reached >90% confluency.

Preparation of Test Inocula: To prepare the virus for inoculation, the virus stock was mixed. Dilution of the mixture was prepared using Earle's Balanced Salt Solution (EBSS).

Test Method

1. Preparation of Test Substance

Disks of unsaturated polyester resin with 7.5 wt % graphene and disks of unsaturated polyester resin without graphene were used as test and control carriers, respectively. Each carrier was sprayed by ethanol and left under an operating biosafety cabinet for 30 minutes prior to the start of the test.

2. Test Procedure

A quantitative test system to closely simulate the field-application of the environmental surface decontamination process (modified quantitative carrier test—Tier 2 or QCT-2 (ASTM 2197)) was applied. The protocol was adapted to test the virucidal efficacy of the coating. CREM Co Labs were provided with the treated (polymer with graphene) and untreated (polymer without graphene) disks. Untreated carriers were considered as the control for the treated carriers. Each carrier received 20 μL of virus inoculum without a soil load. The exposure time was calculated from the moment that each disk received the inoculum. Three disks of each group of treated and untreated control carriers were then eluted and the eluates assayed for viable virus at the contact times.

Experimental Design

1. Input

The stock virus utilized in the testing was titrated by 10-fold serial dilutions and plaque assayed for infectivity to determine the starting titer of the virus. The results of this control were for informational purposes only.

2. Efficacy Test

Disks of test material were used in testing of this method. At each contact time, 3 carriers of each group were assessed (control, non-treated, and treated). Each disk received 20 μL of virus inoculum. The contact time was calculated from the time of placing virus inoculum on each disk using a calibrated timer. After the specific exposure time, three disks of each group were removed from the petri dish and each disk was placed into a Nalgene vial containing 2 mL of an eluent. The MRC-5 cells in multi-well culture plates were inoculated with 100 µL of the dilutions prepared from test and control samples. Uninfected indicator cell cultures (cell controls) were inoculated with 100 µL EBSS alone. The cultures were incubated at 33±1° C. in a humidified atmosphere of 5% CO2 for six days before fixing and staining them for counting the plaque-forming units (PFU). Three control disks were included in each test to estimate the initial contamination on the carriers. The test was initiated with processing one control before the processing test carriers, one in the middle of the test and ended up with the third control. This was done to take into the account the changes in the input level of the test organisms during the experiment.

Data Analysis

1. Calculation of $Log_{10}$ Reduction $Log_{10}$ Reduction = $Log_{10}$ of average *PFU* from control carriers –

$log_{10}$ of average *PFU* the test carriers.

Test Results

The initial challenge on each carrier was 4.19 $log_{10}$ PFU. The average $log_{10}$ PFU recovered from the control carriers after contact time was 3.01 $log_{10}$ PFU for 120 minutes contact time. Table 1 shows the results of $log_{10}$ reduction. In this test, no drying time was considered since the anti-viral activity of the coating starts from the time of inoculation of phages on the coated disks. The coating demonstrated 1.17 $Log_{10}$ reduction (93.26% reduction) in 120 minutes.

TABLE 1

| Virucidal Efficacy of the coating technology against Human Respiratory Coronavirus 229E (ATCC VR-740) at 120 minute contact times | |
| --- | --- |
| | $Log_{10}$ Reduction in PFU |
| Contact Times | 120 min |
| Log10 Reduction | 1.17 |
| Percent Reduction | 93.26 |

This sample shows a minimum of one order of magnitude improvement on the number of living cells on the surface after two hours of exposure to SARS-CoV-2. The test was performed based on modified ASTM 2197 and intended for use on the surfaces of the high traffic areas to reduce the chances of community transfer of SARS-CoV-2 through contaminated surfaces. A combination of large charge density along with low surface energy values of the surface of the coating resulted into enhanced protection of the living cells on the surface. High charge density disrupted the spike proteins of the virus and reducing its infectiousness while low surface energy reduced the probability of virus sitting on the surface of the coating.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of forming an anti-viral surface, the method comprising:
   covalently functionalizing graphene with at least one of a carboxyl group or a carbonyl group and at least one of ethylenediamine or polyethyleneimine to obtain a non-oxidized amine-edge-functionalized graphene;
   mixing the non-oxidized amine-edge-functionalized graphene with a catalyst and a thermoset material to form a mixture, the non-oxidized amine-edge-functionalized graphene making up between 7 wt % and 25 wt % of the mixture;
   applying a high-shear mixing process to the mixture to form a mixed liquid; and
   coating the mixed liquid onto a base surface to form the anti-viral surface.

2. The method of claim 1, further comprising:
   chemically treating graphene to produce the non-oxidized amine-edge-functionalized graphene.

3. The method of claim 1, wherein the thermoset material includes a thermoset matrix, the method further comprising:
   dispersing the non-oxidized amine-edge-functionalized graphene into the thermoset matrix via the high-shear mixing.

4. The method of claim 3, wherein dispersing the non-oxidized amine-edge-functionalized graphene into the thermoset matrix is via a ball mill, a high-shear mixer, and/or a homogenizer.

5. The method of claim 3, further comprising:
   dispersing the non-oxidized amine-edge-functionalized graphene into a solvent prior to dispersing the non-oxidized amine-edge-functionalized graphene into the thermoset matrix.

6. The method of claim 5, wherein the solvent includes styrene.

7. The method of claim 1, wherein the base surface is composed of a metal, a glass, and/or a plastic.

8. The method of claim 1, wherein the coating is via at least one of spraying, rolling, or brushing.

9. The method of claim 1, further comprising:
   curing the anti-viral surface via exposure to ultraviolet rays.

10. The method of claim 1, further comprising:
    adding a curing agent to the mixed liquid.

11. The method of claim 10, wherein the curing agent includes at least one of an aliphatic amine, a cycloaliphatic amine, a polyamide, an amidoamine, or an anhydride.

12. The method of claim 11, wherein the curing agent includes at least one of aminoethylpiperazine, diethylenetriamine, or triethylenetetramine.

13. The method of claim 11, wherein the curing agent includes melamine formaldehyde.

14. The method of claim 11, wherein the curing agent includes isophorone diamine.

15. The method of claim 11, wherein the curing agent includes methylhexahydrophthalic anhydride.

16. The method of claim 1, wherein the catalyst includes at least one of N,N-dimethyl-p-toluidine, dibutyltin dilaurate, a peroxide, or a tin-based catalyst.

17. The method of claim 16, wherein the catalyst includes at least one of dicumyl peroxide, di-tert-butyl peroxide, or methyl ethyl ketone peroxide.

18. The method of claim 16, wherein the catalyst includes at least one of an inorganic tin (II) based catalyst, or an organotin (IV) based catalyst.

19. The method of claim 1, wherein the thermoset material includes at least one of a polyol, a polyurethane, an unsaturated polyester, and an unsaturated epoxy.

20. A method of forming an anti-viral surface, the method comprising:

functionalizing graphene with at least one of ethylenediamine or polyethyleneimine to obtain a non-oxidized edge-functionalized graphene;

mixing the non-oxidized edge-functionalized graphene with a catalyst and a thermoset material to form a mixture, the non-oxidized edge-functionalized graphene making up between about 7 wt % and about 25 wt % of the mixture;

applying a high-shear mixing process to the mixture to form a mixed liquid; and coating the mixed liquid onto a base surface to form the anti-viral surface.

21. The method of claim 20, further comprising:

chemically treating graphene to produce the non-oxidized edge-functionalized graphene.

22. The method of claim 20, wherein the thermoset material includes a thermoset matrix, the method further comprising:

dispersing the non-oxidized edge-functionalized graphene into the thermoset matrix via the high-shear mixing.

23. The method of claim 22, wherein dispersing the non-oxidized edge-functionalized graphene into the thermoset matrix is via a ball mill, a high-shear mixer, and/or a homogenizer.

24. The method of claim 22, further comprising:

dispersing the non-oxidized edge-functionalized graphene into a solvent prior to dispersing the non-oxidized edge-functionalized graphene into the thermoset matrix.

25. The method of claim 24, wherein the solvent includes styrene.

26. The method of claim 20, wherein the base surface is composed of a metal, a glass, and/or a plastic.

27. The method of claim 20, wherein the coating is via at least one of spraying, rolling, or brushing.

28. The method of claim 20, further comprising:

curing the anti-viral surface via exposure to ultraviolet rays.

29. The method of claim 20, further comprising:

adding a curing agent to the mixed liquid.

30. The method of claim 29, wherein the curing agent includes at least one of an aliphatic amine, a cycloaliphatic amine, a polyamide, an amidoamine, or an anhydride.

31. The method of claim 20, wherein the catalyst includes at least one of N,N-dimethyl-p-toluidine, dibutyltin dilaurate, a peroxide, or a tin-based catalyst.

32. The method of claim 20, wherein the thermoset material includes at least one of a polyol, a polyurethane, an unsaturated polyester, and an unsaturated epoxy.

* * * * *